Figure 1:
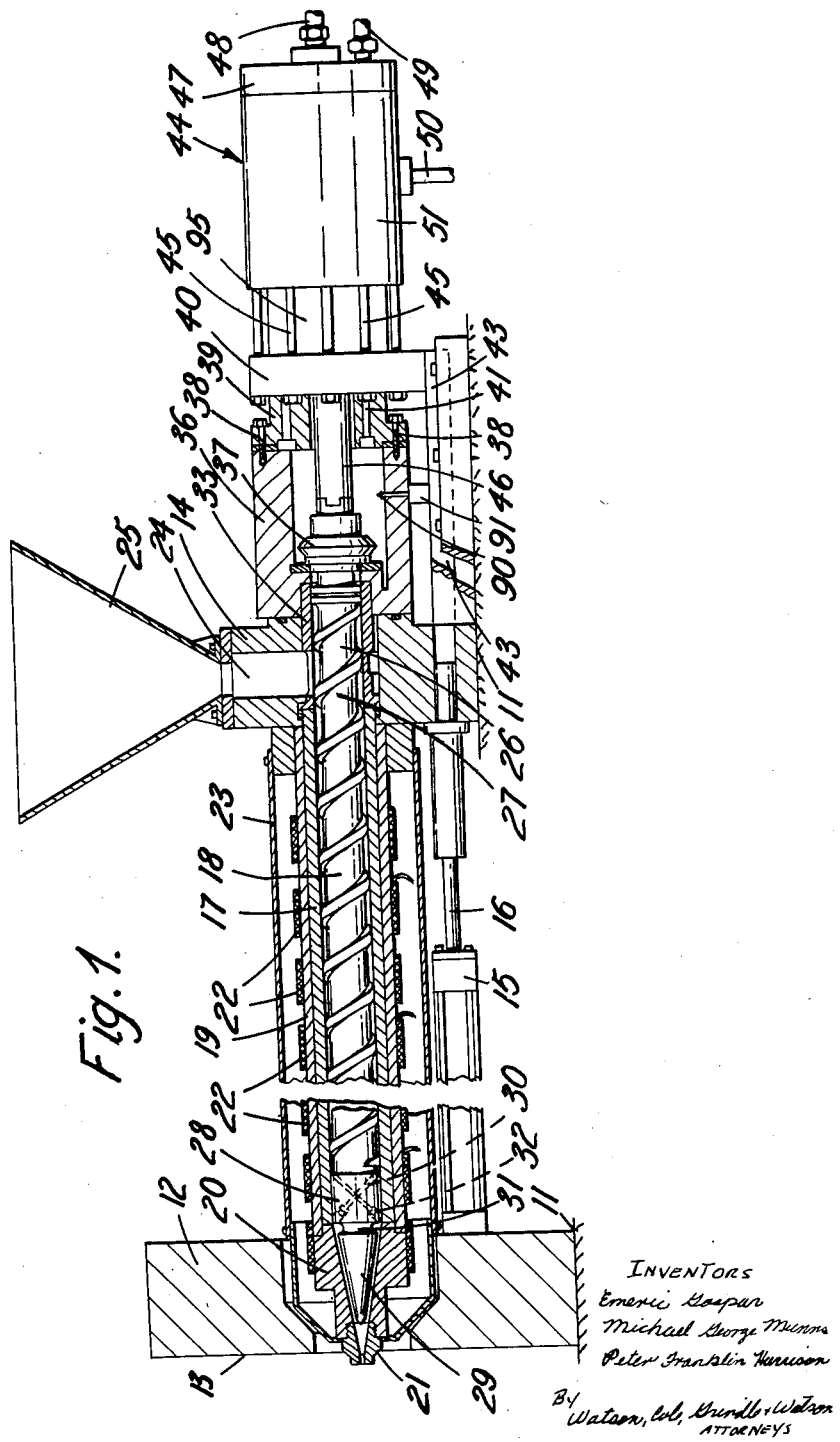

Dec. 18, 1962     E. GASPAR ETAL     3,068,521
HYDRAULIC MOTOR DRIVEN INJECTION MOULDING MACHINES
Filed Oct. 19, 1960     8 Sheets-Sheet 1

INVENTORS
Emeric Gaspar
Michael George Munns
Peter Franklin Harrison
BY
Watson, Cole, Grindle & Watson
ATTORNEYS

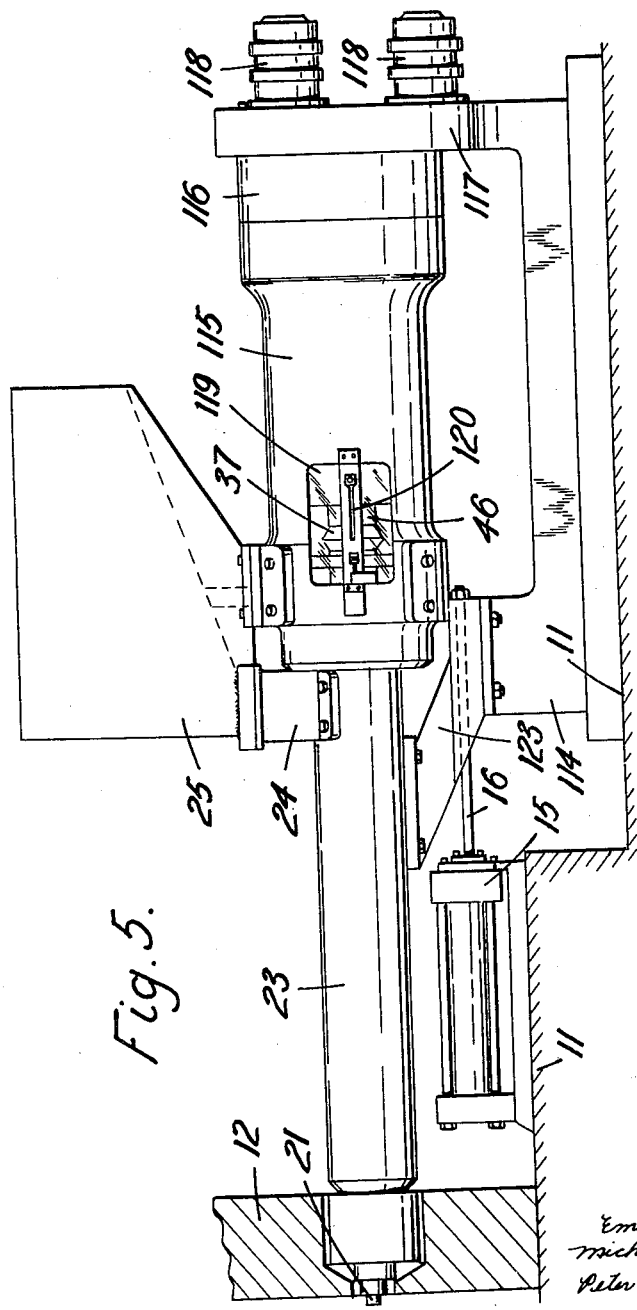

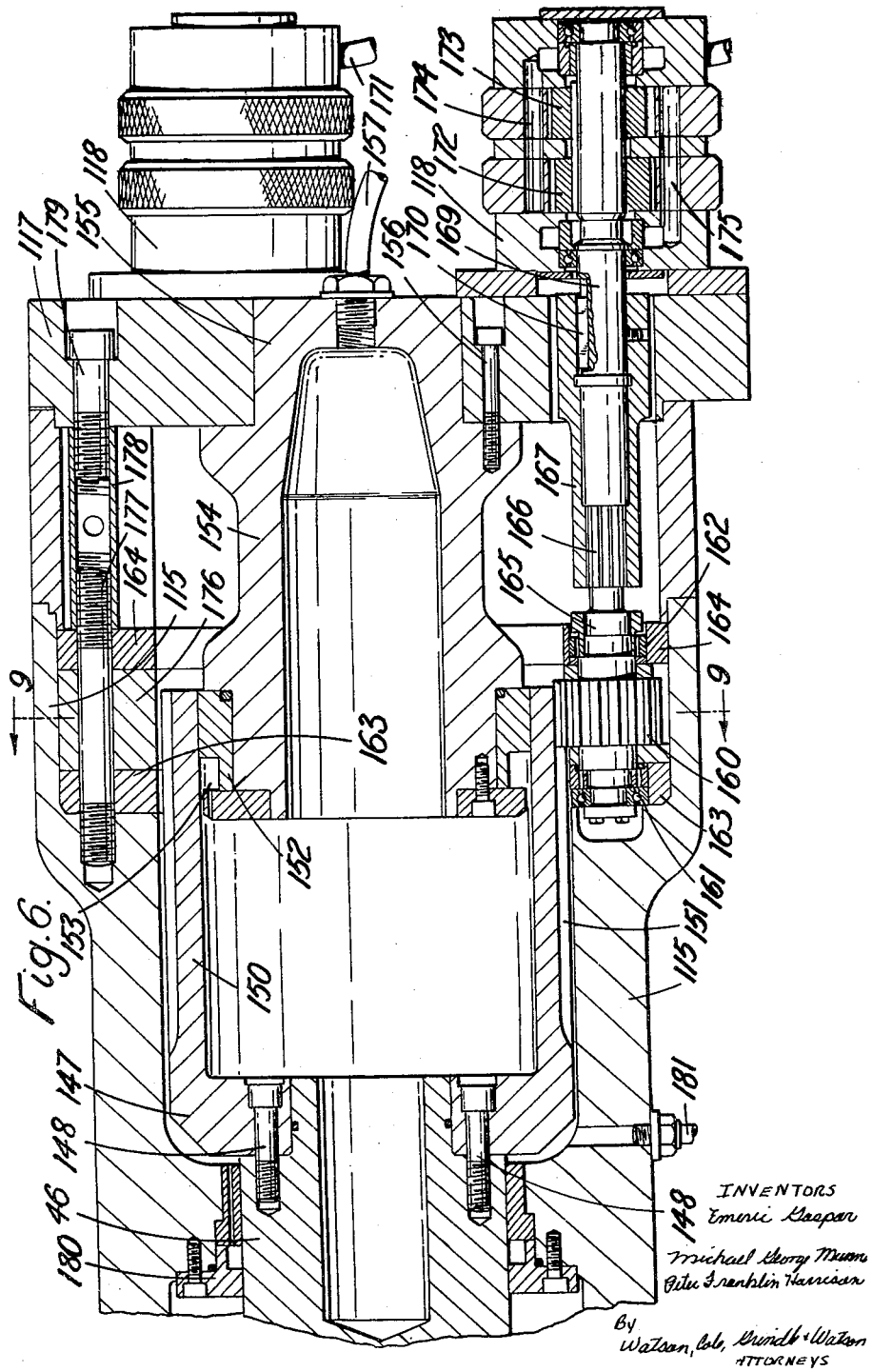

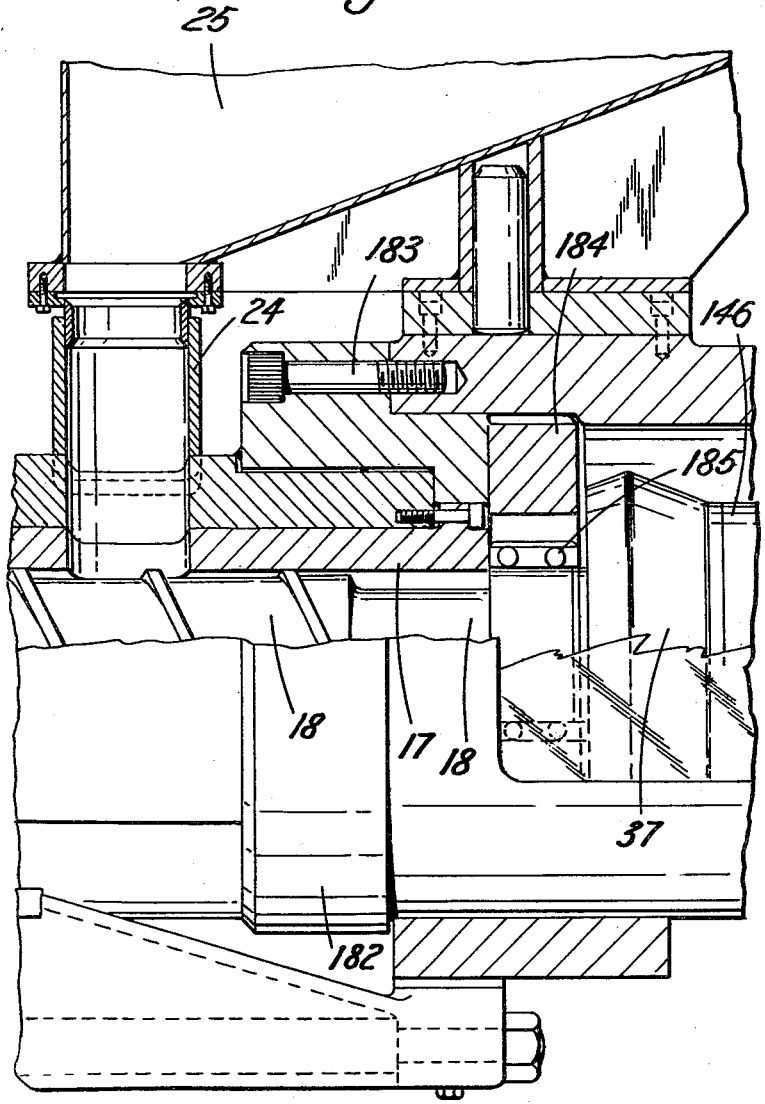

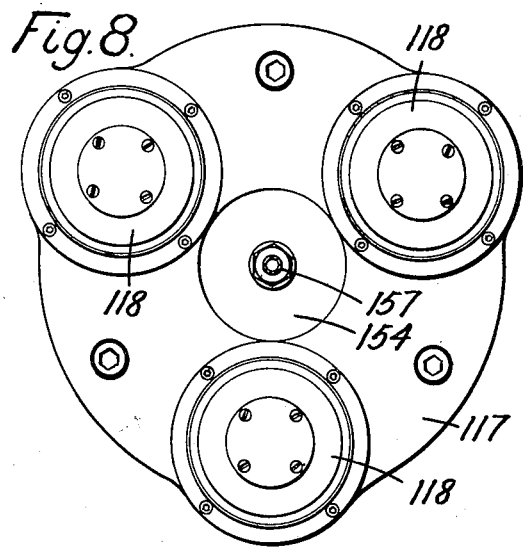
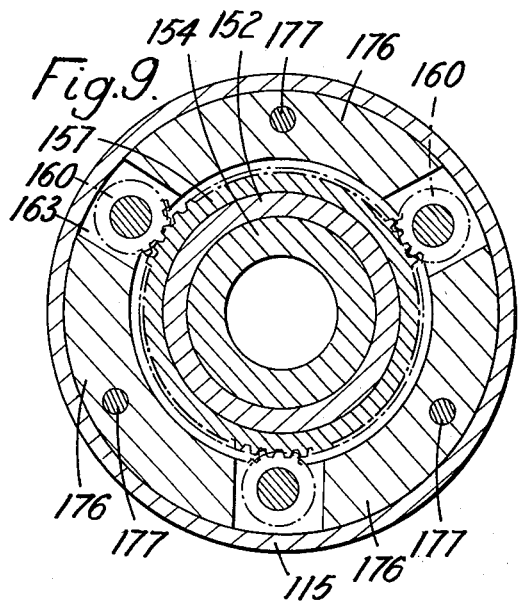

United States Patent Office 3,068,521
Patented Dec. 18, 1962

3,068,521
HYDRAULIC MOTOR DRIVEN INJECTION MOULDING MACHINES
Emeric Gaspar, Michael George Munns, and Peter Franklin Harrison, all of London, England, assignors to The Projectile and Engineering Company Limited, London, England, a British company
Filed Oct. 19, 1960, Ser. No. 63,519
Claims priority, application Great Britain Jan. 18, 1960
5 Claims. (Cl. 18—30)

This invention relates to an anhydraulic motor driven injection moulding machine. It is an object of the invention to provide an hydraulic motor for an injection moulding machine which is capable of effecting rotary and also translational movement of the driven part. It is a further object of the invention to provide such a motor which will readily withstand the thrust of translational movement without interfering with rotational movement and in which both movements can be independently controlled.

In injection moulding machines it is known to use a rotating worm in a heating chamber for the plastic material, to propel plastic material through the chamber and to compress it. It is also known in an injection moulding machine to inject the material so compressed into a mould by endwise movement of the parts. The injection force is very great, especially in the case of large moulds and may rise to hundreds of tons in a large machine. The problem of providing for a rotating part which also has to withstand very high thrust pressures and to transmit a very high torque for rotating the worm is a difficult one and the present invention provides a solution in which heavy thrust bearings are avoided. The invention comprises, in one of its aspects, an injection moulding machine having in combination a plasticising chamber with a circular through passage, a nozzle thereon for connection to a mould, a feed worm in the passage, means for admission of moulding material to the feed worm, a drive-shaft for the feed worm capable of rotation and simultaneous axial displacement, means for operating the drive-shaft comprising a cylinder-and-piston device coaxial with the shaft and one element of which is secured to the shaft, a gear-ring coaxial with the cylinder-and-piston device, driving pinion means meshing with the gear-ring, one of the two latter being movable axially with the element which is secured to the shaft and the teeth of one being long enough axially to remain in mesh with the other throughout said axial displacement, and hydraulic motor-means for rotating the driving pinion means.

In another aspect the invention includes an hydraulic motor comprising in combination a motor element having a rotatable output member, a pinion driven by the output member, a gear-ring in mesh with the pinion, one of these two parts being axially movable and one of these two parts having teeth long enough to remain in mesh with the other when the axially movable member makes a full stroke, a piston-and-cylinder device of which one element is connected to the axially movable part to move axially and rotate therewith and whereof the other element is fixed, and means for connecting the element which moves with the axially movable part to a member which is to be both rotated and axially moved.

Figure 2:
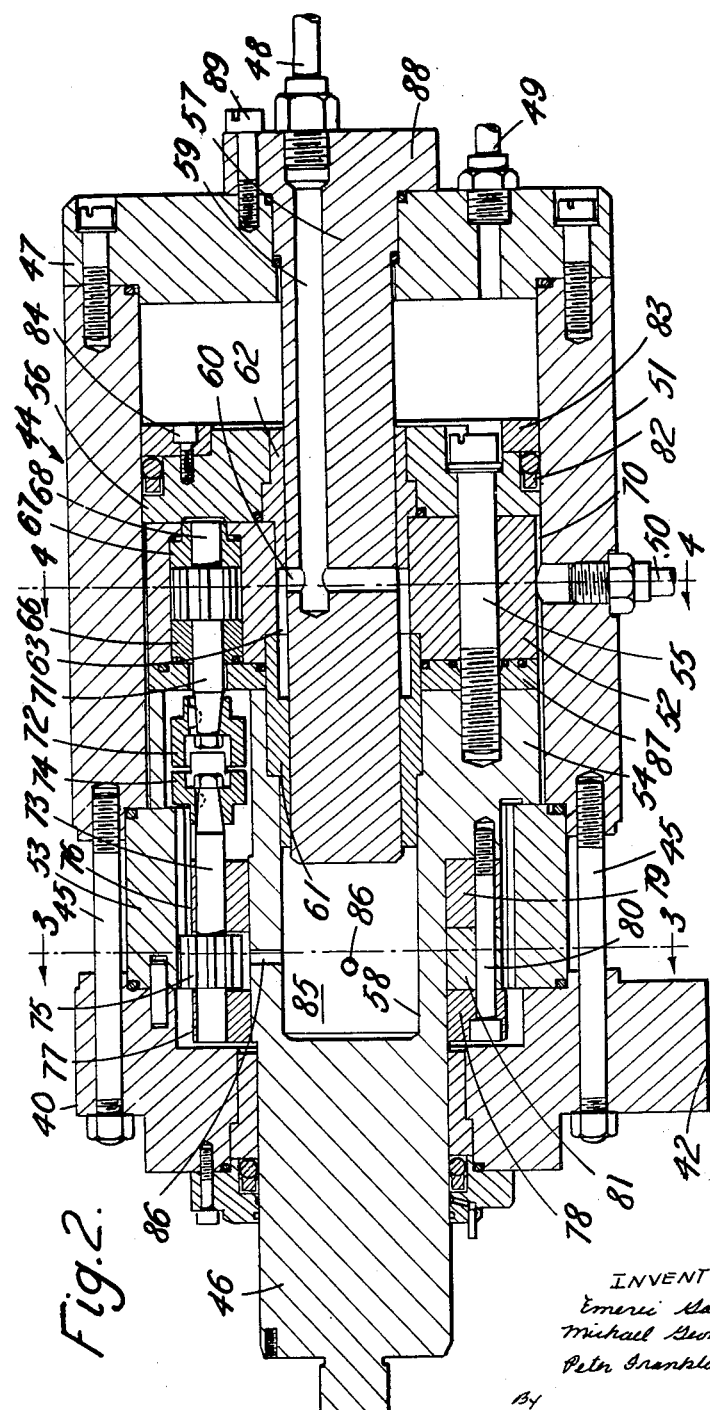
Figure 3:
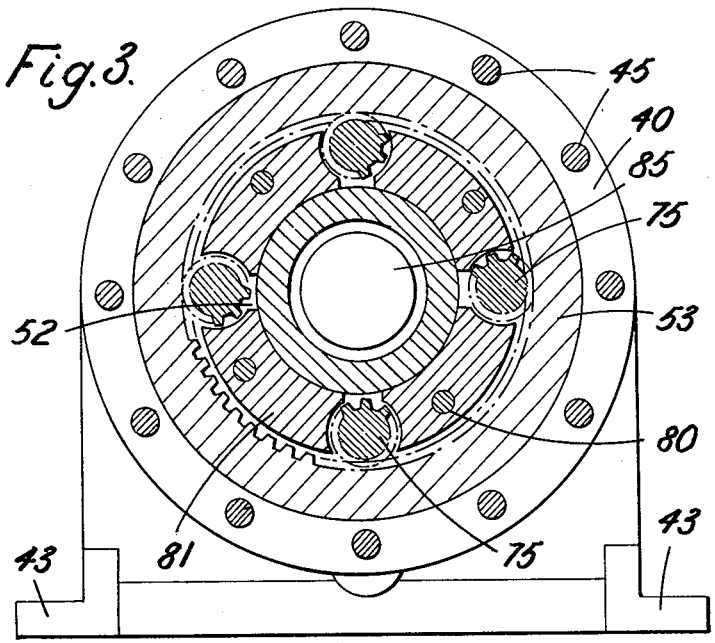
Figure 4:
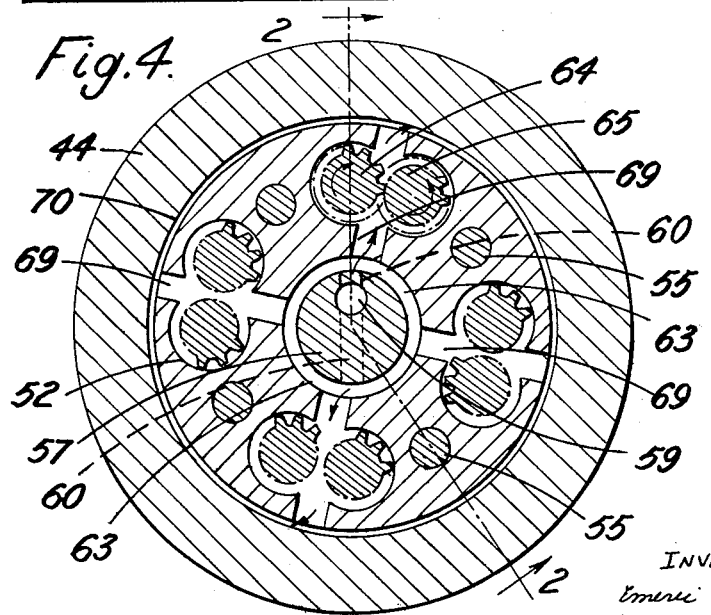
Figure 10:
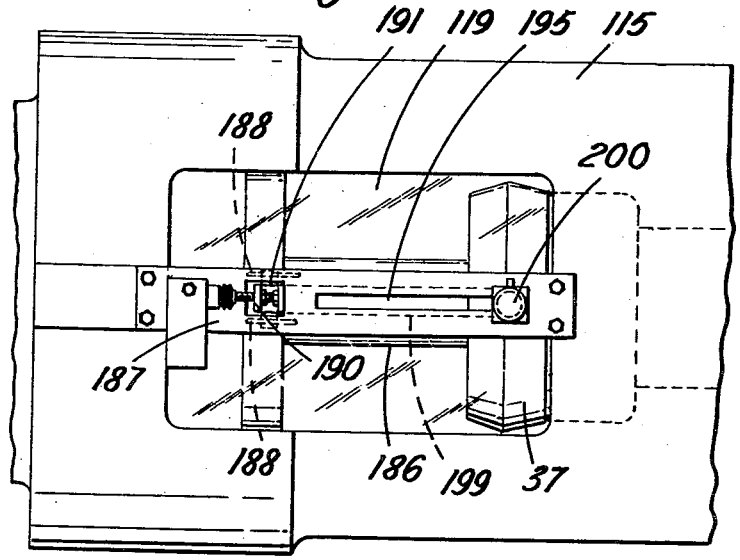
Figure 11:
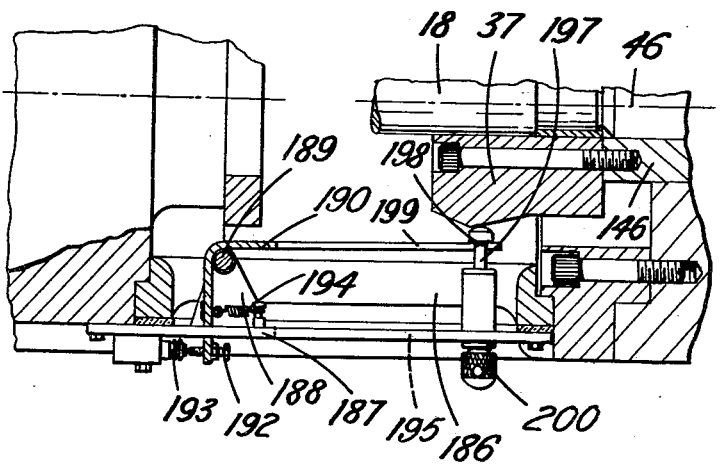

The invention will now be further described in conjunction wtih the accompanying drawings in which:

FIGURE 1 is a longitudinal section through an injection moulding machine and an hydraulic motor therefor;
FIGURE 2 is a longitudinal section through the motor shown in FIGURE 1 upon the line 2—2 of FIGURE 4;
FIGURE 3 is a cross-section upon the line 3—3 of FIGURE 2;
FIGURE 4 is a cross-section upon the line 4—4 of FIGURE 2;
FIGURE 5 is a side elevation of a further injection moulding machine and hydraulic motor for operating the same;
FIGURE 6 is a longitudinal section through the motor portion of the machine shown in FIGURE 5;
FIGURE 7 is an enlarged view of the central portion of the machine shown in FIGURE 5, shown partly in section;
FIGURE 8 is an end view of the machine of FIGURE 5 looking from the right-hand end of the figure;
FIGURE 9 is a cross-section upon the line 9—9 of FIGURE 6, looking in the direction of the arrows;
FIGURE 10 is a detail of a limit switch operating cam, and
FIGURE 11 is a horizontal section upon the centre line of FIGURE 10, looking downwards.

Referring to FIGURE 1, the injection moulding machine comprises a frame 11 of which only a small portion is indicated in the figure and which supports a platen 12 having a vertical face 13 against which a mould (not shown) is clamped. The mechanism for clamping the mould against the face 13 of the platen 12 may be of any usual or desired construction mounted on the base 11 and does not, in itself, form any part of the present invention. A feed block 14 is mounted to slide upon another part of the base 11 and is connected to the platen 12 by an hydraulic jack cylinder 15 having a ram 16 connected to the block 14. The plasticizing chamber 17 is a long cylindrical chamber with a circular through passage which is occupied by a rotatable feed worm 18. The chamber is surrounded by a sleeve 19 which serves to unite it to a nozzle section 20 carrying an injection nozzle 21. The purpose of the jacks 15, 16 is to draw the feed block 14 with the plasticising chamber and the nozzle 21 firmly toward the injection opening in a mould when the latter has been clamped against the face 13 of the platen 12. The plasticising chamber is surrounded with electrical heater units 22 and with a light casing 23.

The feed block 14 has a feed throat 24 through which material may be fed to the feed worm 18 and above the throat 24 is a feed hopper 25, with which may be associated means for regulating the feed of pulverulent plasticisable material to the worm, which are not shown in the present specification as they form no part of the present invention. The feed worm 18 has a comparatively shallow thread in the portion 26 which immediately underlies the throat 24, a deeper thread in the turn 27 immediately beyond the throat and a thread of gradually decreasing depth from this point toward the end which is nearest the nozzle. By this means, it is ensured that the pulverulent material falling from the throat 24 will be limited in quantity by the shallowness of the thread 26 and will be left free so as to remain loose in the space afforded by the deeper thread 27, immediately beyond the throat. Choking of the worm is therefore avoided. As the worm rotates, the material is urged toward the left as viewed in the figure and it becomes gradually plasticised by the heat imparted by the heating elements 22. In so doing, the material is compressed. Moreover in the heated condition it acquires strong adhesion to the internal walls of the plasticising chamber 17 and this adhesion ensures that as the worm rotates, the plasticised material will be fed firmly forward and highly compressed. At the end of the worm nearest to the nozzle 21 is a piston 28 formed integrally with the worm and fitting the bore of the plasticising chamber 17. Beyond the piston and also integral with the worm is a conical nose piece 29 which nearly fills the decreasing bore of the nozzle-carrying portion 20.

In order to permit passage of the plastic material through the piston 28, the piston contains a plurality of passages, shown in dotted lines in the figure at 30, which extend from the space between the end of the worm and the piston 28 through the piston to a space formed by a groove 31 at the base of the conical nosepiece 29. In these passages 30 there are non-return ball-valves 32. The passages are drilled at an angle as shown and are partially tangential to the axis of the worm so that they do not intersect one another.

Behind the throat 24 the worm 18 lies in a rearwardly projecting portion 33 of the chamber 17 and the worm spindle projects rearwardly out of the plasticising chamber into a spacing member 36, which is bolted to the feed block 14 and is hollow to afford space for a cam 37 mounted on the spindle of the worm. Secured to the spacing member 36 by bolts 38, is a flanged ring 39 and the flanged ring is secured to a collar 40 by means of screws 41. The collar 40 has a flat bottom portion 42 (FIGURE 3) and rests on bearing shoes 43 which are united to the feed block 14 and are carried in a slide on the base 11 of the machine. An hydraulic motor 44 is held against the collar 40 by a ring of bolts 45 and the motor operates a shaft 46 which is connected to the spindle of the worm 18 so as to transmit rotation and thrust thereto. The motor shaft 46 is capable of being rotated by the motor 44 and also of being urged under hydraulic pressure to the left, as viewed in the figure. The motor has an end-plate 47, a supply connection 48 for rotating the shaft, a further supply 49 for moving the shaft endwise and an exhaust pipe 50. The internal construction of the motor may be of any kind which will effect the motions described but one suitable construction is shown in FIGURES 2, 3 and 4, whilst a second construction is shown in FIGURES 6 to 11.

Referring now to FIGURES 2, 3 and 4, the motor comprises a cylindrical housing 51 within which works a sliding and rotatable motor casing 52. Between the housing 51 and the collar 40, the bolts 45 serve to grip an internally toothed ring 53. The motor shaft 46 passes through the toothed ring 53 and has an enlarged head 54 which is secured to the motor casing 52 by set-screws 55. The set-screws 55 also secure to the casing 52 a piston head 56 which fits the interior of the housing 51 and enables the motor shaft 46 to be reciprocated by pressure supplied to the cylindrical interior of the housing through pipe 49.

Secured in the centre of the end-plate 47 is a longitudinally extending plug 57 which enters a bore 58 formed in the head 54 and the rear end of the shaft 46. The purpose of the plug 57 is to supply hydraulic pressure to the motor for rotating the shaft 46 and to this end the supply pipe 48 is connected to the plug and the plug has a central passage 59 leading to transverse ports 60. The motor casing 52 fits over the ends of bushes 61, 62 which serve to centralise the casing relatively to the piston head 56 and to the head 54 of the shaft and also to afford closely fitting bearings for the plug 57. The motor casing 52 is spaced from the plug by an annular space 63 and it is provided with tubular bores parallel to its axis at four places around its centre, as shown in the section FIGURE 4 in which bores operate motor gear-wheels 64, 65. The ends of the bores contain bushes 66, 67 to support gear shafts 68 formed integral with the gears. Radial ports 69 formed in the casing 52 serve to admit fluid under pressure to the pairs of gears from the annular space 63 and on the outer side of the gears the ports are continued into an outer annular space 70 which is connected to the exhaust pipe 50. The pairs of gears 64, 65 when pressure fluid is applied to them from the interior as indicated by the arrow beneath the uppermost pair in FIGURE 4, act as hydraulic gear motors in a well known manner and rotate in the direction indicated by the curved arrows marked on the gears. The pressure fluid presses on the flanks of the gear teeth to the exhaust passage leading to the outer annular space 70. The gears, of course, fit the spaces in which they work as closely as possible for a running fit.

One gear of each of the pairs 64, 65 has its shaft 68 extended as shown at 71 to enter a coupling member 72. In line with the coupling member is a power-transmission shaft 73 which carries a second coupling member 74 and the coupling members 72, 74 serve to transmit power between the shafts 68 and 73 while permitting slight lack of concentricity between the two shafts. Each of the shafts 73 carries a pinion 75 which meshes with the internal annular gear-ring 53 and so when the shafts are rotated the pinions engaging the fixed gear-ring execute a planetary rotation and drive the motor shaft 46 accordingly. The shafts 73 are supported in bearing journals 76, 77 formed in rings 78, 79 which surround the shaft 46 and are secured thereto by screws 80 which enter the enlarged head 54 of the shaft. The bearing rings 78, 79 are spaced apart by an intermediate ring 81 sufficiently to allow the pinions 75 to rotate freely. The internal gear-ring 53 is long enough to permit the longitudinal motion imparted to the shaft 46, without the pinion 75 moving out of mesh with the gear-ring.

The piston head 56 carries a packing ring 82 to work on the interior of the wall of the cylinder housing 51 and the packing ring is held in place by a cover ring 83 secured by screws 84 to the main part of the piston head 56. It will be noted that between the end of the cylindrical plug 57 and the end of the bore 58, the construction provides a closed chamber 85. In order to prevent any hydraulic fluid which may leak into this chamber, from interfering with the operation of the parts, a bleed hole 86 is provided opposite each of the driving pinions 75 and any fluid which enters the chamber 85 finds its way through the bleed holes 86 into the space occupied by the pinions 75 and serves to lubricate the parts. It is to be noted that between the motor case 52 and the head 54 of the shaft 46 there is interposed a flat ring 87 which is provided with oil-sealing rings inside and outside bolts 55 and the shafts 68 and which serves to prevent oil leakage. Sealing rings are similarly provided at other points where leakages may occur, as shown in the drawing. The central pressure supply plug 57 is secured to the end-plate 47 by means of a flanged head 88 and set-screws 89.

The operation of this injection moulding machine and motor is as follows:

Assuming that the parts are in the position shown in the drawing and that a new cycle is about to commence, if the machine has been operated on a previous cycle, there will be a mould clamped against the left-hand face of platen 12 with the nozzle 21 in close engagement therewith. The mould will have been filled with plastic and the motor 44 will be rotating the worm 18. As the worm rotates, pulverulent material from the hopper 25 falls into the shallow threaded part 26 of the worm and is propelled toward the left in the figure. As it reaches the deep part 27 of the thread there is more room for it than beneath the hopper. As the material is moved toward the left it becomes softened and adherent to the casing and is compressed by reason of the increasing shallowness of the thread of the worm until it arrives at the left-hand end of the worm, as drawn in the figure, in a fully plastic and compressed condition. Here it is forced through the passages 30 and non-return valves 32 and the space formed by the recess 41 and thence around the conical nose-piece 29 toward the nozzle.

Inasmuch as the mould is full, the plastic material cannot be forced through the nozzle but as the worm with its motor-shaft 46 is capable of being moved endwise, these parts, including the cam 37, will gradually be forced toward the right as viewed in the figure. In order to ensure that a suitable degree of compression is maintained on the plasticised material, pressure is admitted behind the piston 56 through the pipe 49, but this pressure is limited by a suitable pressure-reducing device so that it does not prevent the rearward movement of the worm. When the worm-shaft reaches the termination of its rearward movement, the cam 37 will engage a striker 90 which stands in its path and operate a limit-switch 91 (see FIGURE 1). Preferably the striker and limit-switch are arranged so that they are adjustable to vary the point of termination of the stroke. On operation of the limit-switch 91 an electro-hydraulic valve is changed over to disconnect hydraulic pressure from the supply pipe 48, so that the rotation of the motor ceases and to increase the hydraulic pressure in the pipe 49 in order to force the motor-shaft 46 with the worm 18 to the left, as shown in the drawing. Before this occurs, and during the retraction motion of the worm, the mould which is held against the nozzle 21 has been opened and the previous moulding removed by the operator, the mould being reclosed in readiness for injection. When, therefore, increased pressure is applied through the pipe 49, the whole worm 18 together with the piston head 28, is forced toward the left as viewed in FIGURE 1, and the piston 28 forces a fresh charge of plasticised material through the nozzle into the mould. The cycle then recommences.

In order to facilitate removal of the moulding from the mould, when the material has set in the mould and towards the end of the period of retraction of the worm 18, the rams 16 can be operated to move the nozzle 21 together with the heating chamber on which it is mounted, away from the mould, thus breaking the sprue between the nozzle and the mould. This facilitates removal of the moulding from the mould and the production of a clean moulding at each cycle.

Referring now to FIGURES 5-11, the general arrangement of the parts is shown in FIGURE 5. The machine has a bed 11 on which is mounted a platen 12 and the nozzle 21, the casing 23 and a plasticising chamber enclosed in the casing 23, together with its worm, substantially the same as is shown in FIGURE 1. In a similar way there is a slidable carriage 114 (corresponding to the slidable feed block 14 of FIGURE 1) which is connected to the frame 11 by means of a ram 16 and jack cylinder 15 as already described. Above the feed worm, within the casing 23, there is mounted a hopper 25 and a feed throat 24.

Behind these parts there is an hydraulic motor comprising a casing 115, an end-plate 116, a connection 117 to the slide 114 and several external hydraulic vane-motors 118. A window 119 in the side of the motor casing 115 permits the cam 37 to be seen and the cam-operated limit-switch is mounted on a fitting 120 hereinafter described. The internal construction of the motor can be seen in FIGURES 6-9.

Referring to FIGURE 6, the motor comprises a power-take-off shaft 46 to which is secured a cylinder head 147 by means of screws 148. The cylinder head has a trunk-like cylinder portion 150 on the outside of which are cut a series of long gear teeth 151. The interior of the cylinder is bored to receive a main piston head 152 provided with sealing means in a groove 153 and supported on a stout column 154, which has a spigot 155 to enter the end-plate 117, in which it is secured by screws 156. A pressure connection 157 extends to the interior of the column 154 which is open to the interior of the cylinder 150 and thus the admission of pressure to the pipe 157 will cause the cylindrical gear member, together with the power output shaft 46, to move to the left as viewed in FIGURE 6. Three pinions 160 within the casing 115 mesh with the gear teeth 151 as shown in FIGURE 9. These pinions are supported in ball-and-roller bearings 161 and 162 carried in rings 163, 164 located on each side of the pinions 160. The pinion shafts 165, which pass through these bearings, extend toward the flange 117 and carry externally splined end-portions 166 which fit into internally splined sleeves 167 passing through apertures in the end-plate 117. Outside the end-plate there are mounted hydraulic motors 118 which have motor-shafts 169 fitting into and keyed within the sleeve 167 by means of keys 170.

The hydraulic motors 118 may be of any desired type and are supplied with hydraulic fluid through supply pipes 171. As shown, the motors consist of two pairs of double gears 172, 173 which are supplied by a port 174 extending above them and are exhausted by a port 175 extending below them. From the port 175 the exhaust fluid is led away through a pipe, not shown.

The end-plate 117, casing 115, rings 163, 164 and spacers 176 are all drawn together by means of studs 177, intermediate screwed sleeves which fit on the studs, as shown at 178, and screws 179 passing through the end-plate 117. The sleeve 146 which surrounds the power-take-off shaft 46 carries the cam 37, shown in FIGURE 5, and this sleeve is surrounded close to the hollow trunk-shaped gear member 150 with a stuffing-box 180. There is a pressure supply connection 181 to the space between the head of the trunk-like member 150 and the stuffing-box 180.

In operation, the motors 118 drive the pinions 115 and rotate the trunk-like member 150, thus rotating the power-take-off shaft 46 and the sleeve 146 which is mounted upon it. The length of the gear-teeth 141 permits retraction of the worm in the same manner as has already been described in connection with FIGURES 1-4. Advance of the worm for the injection stroke is effected by admitting pressure through the column 154 to the space inside the cylindrical trunk member 150. Retraction without rotation can be effected, if desired, by admitting pressure through the pipe 181. Pressure required behind the worm during retraction by its rotation, if desired, can be obtained by admitting fluid to the interior of the member 150 and can be governed by moderating this pressure.

The cam 37 operates a limit-switch in accordance with what has already been described. Connection of the parts to the worm 18 is shown in detail in FIGURE 7 of the drawing, which shows the hopper 25 connected to throat 24 opening downwardly into the space around the worm 18 and which shows the rear end of the plasticising chamber 17 secured within a ring 182 which is held on the end of the casing 115 by means of screws 183. The ring 182 serves to hold in position a housing 184 for a ball-race 185 which supports the rear end of the worm shaft 18 close to where it is secured, within the cam 37, to the power-take-off 46 of the motor.

FIGURES 10 and 11 show details of the limit-switch operated by cam 37. The window 119 is filled in with plastic material 186 which is slotted to allow the insertion in the window opening of a metal bracket 187, which extends parallel with the axis of the apparatus. Toward one end the bracket plate 187 carries two rearwardly extending ears 188, between which is pivoted a rock-shaft 189 to which is welded a bell-crank lever 190. One arm of the bell-crank lever extends parallel to the centre line of the apparatus and the other arm extends outwardly through a square aperture 191 to the outside of the bracket plate 187 where it carries an adjustable set-screw 192 for operating a micro-switch 193. The lever is drawn away from the micro-switch by a light spring 194 secured to the back of the plate 187.

The plate 187 is longitudinally slotted at 195 and in the slot there is slidably mounted a plunger casing 196. The plunger casing carries a spring pressed plunger 197 having a head 198 to engage the cam. The stem of the plunger passes through a long slot 199 in that arm of the bell-crank lever 190 which extends parallel to the axis of the machine. The spring plunger mounting 196 can be adjusted by means of a clamping screw 200 to any desired position along the slot 195; moving the mounting along the slot 195 will move the head 198 along the slot 199 and will alter the position at which the cam 37 will engage the head 198 and operate the lever 190 to actuate the limit-switch 193. Therefore, the length of the retraction stroke of the machine can be easily adjusted to suit the amount of plastic material which must be injected to fill the mould at each cycle of operations.

These hydraulic motors are conveniently used with hydraulic pressures of the order of 1000 p.s.i. By forming the gear teeth 151 on the external periphery of the extension 150 we have found that a satisfactory tooth shape can be easily obtained. Furthermore the pinions 160 may be of greater diameter than in the construction of FIGURES 2 to 4 and thus the shape of the pinion teeth can be easily generated.

We have also found that vane-motors can be used to drive the pinions 160 instead of gear-motors and the amount of noise made during operation of the machine is thereby reduced.

We claim:

1. An injection moulding machine comprising in combination a plasticising chamber with a circular through passage, a nozzle thereon for connection to a mould, a single feed-worm in the passage, means for admission of moulding material to the feed-worm, a drive-shaft secured to the feed-worm and capable of simultaneous rotation and axial displacement, a piston secured to the drive-shaft to displace it axially, a cylinder in which the piston operates, an internally toothed gear ring fixed relatively to the cylinder, driving pinion means meshing with the gear ring and journalled in a part carried by the pistons so that if rotated they rotate the piston and feed-worm, and hydraulic motor means also caried by and rotatable with the piston and feed-worm and operatively connected to the driving pinion means to drive the same.

2. A machine as claimed in claim 1 wherein the hydraulic motors are of the type consisting of pairs of meshing gears.

3. A machine as claimed in claim 1 wherein the piston acts as a motor-casing and contains motor-pinion receiving recesses, pairs of meshing pinions are disposed in the recesses and constitute the hydraulic motors, one pinion of each pair being drivingly connected to the driving pinion-means, the piston being provided with an internal axial supply chamber and radial supply ports therefrom to the pairs of pistons and with an external annular recess and radial exhaust ports thereto from the pairs of pistons.

4. A machine as claimed in claim 3 wherein the axial supply passage of the piston is kept supplied through an axial cylindrical plug which fits the axial supply passage in the piston, is secured to the cylinder of the motor and contains a longitudinally-extending pressure fluid passage.

5. A machine as claimed in claim 3 wherein the hydraulic motors consist of vane motors.

References Cited in the file of this patent

UNITED STATES PATENTS

| 1,647,621 | Hawley | Nov. 1, 1927 |
| 2,356,167 | McKelvey | Aug. 22, 1944 |
| 2,842,011 | Skowron | July 8, 1958 |
| 2,890,491 | Hendry | June 16, 1959 |
| 2,916,769 | Baigent | Dec. 15, 1959 |

FOREIGN PATENTS

| 555,379 | Italy | July 1, 1955 |